United States Patent [19]

Mark et al.

[11] 4,415,722

[45] Nov. 15, 1983

[54] BRANCHED AROMATIC POLYCARBONATE FROM ALIPHATIC POLYOL

[75] Inventors: Victor Mark, Evansville; Charles V. Hedges, Mt. Vernon, both of Ind.

[73] Assignee: General Electric Company, Mt. Vernon, Ind.

[21] Appl. No.: 360,045

[22] Filed: Mar. 19, 1982

[51] Int. Cl.$^3$ .............................................. C08G 63/62
[52] U.S. Cl. .................................. 528/196; 260/463; 528/370; 528/372
[58] Field of Search ....................... 528/196, 370, 372

[56] References Cited

U.S. PATENT DOCUMENTS

| | | | |
|---|---|---|---|
| 2,964,797 | 12/1960 | Peilstocker et al. | 528/204 |
| 3,062,780 | 11/1962 | Rinke et al. | 528/204 |
| 3,544,514 | 12/1970 | Schnell et al. | 260/47 |
| 3,644,538 | 2/1972 | Starnes | 568/720 |
| 4,009,148 | 2/1977 | Neuray et al. | 528/204 |
| 4,277,600 | 7/1981 | Mark et al. | 528/204 |

OTHER PUBLICATIONS

English Language Translation of Chemische Berichte, 1912, pp. 2489–2491.
Zaheer et al., Reactions of α–Halogeno–ketones with Aromatic Compounds Part I, J. Chem. Soc., pp. 3360–3362, 1954.
Zaheer et al., Reactions of α–Halogeno–ketones with Aromatic Compounds Part II, J. Chem. Soc., pp. 1706–1708, (1954).

*Primary Examiner*—Harold D. Anderson
*Attorney, Agent, or Firm*—Martin B. Barancik

[57] ABSTRACT

This invention relates to the use of polyol compounds as branching agents for the manufacture of randomly branched novel polycarbonates. The polycarbonates are useful for the fabrication of blow molded articles.

8 Claims, No Drawings

BRANCHED AROMATIC POLYCARBONATE FROM ALIPHATIC POLYOL

This invention relates to the use of polyol compounds as branching agents for the manufacture of randomly branched novel polycarbonates. These randomly branched polycarbonates are colorless, have excellent thermal resistance, excellent light stability, enhanced hydrolytic stability and high melt strength as compared to other branched polycarbonates. These desirable properties make the novel branched polycarbonates particularly useful for the fabrication of blow molded articles although they may be employed for diverse molding applications.

BACKGROUND OF THE INVENTION

Polycarbonates are well known, commercially important materials which are produced in large quantities. Such polymers are typically prepared by reacting a carbonate precursor with a dihydric phenol to provide a linear polymer consisting of units of the dihydric phenol linked to one another through carbonate linkages. These polymers have outstanding mechanical, thermal, and optical properties such as high tensile strength, optical clarity (transparency), thermal and dimensional stability and impact strength.

These aromatic polycarbonates differ from most thermoplastic polymers in their melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. However, in contrast to most thermoplastic polymers, polycarbonates prepared from dihydric phenols exhibit Newtonian flow at normal processing temperatures and shear rates below 300 reciprocal seconds.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding. Non-Newtonian flow characteristics tend to be impart melt elasticity and melt strength to polymers thus allowing their use in blow molding fabrication. In the usual blow molding operation, a tube of a molten thermoplastic is extruded vertically downward into a mold, followed by the introduction of a gas, such as air, into the tube thus forcing the molten plastic to conform to the shape of the mold. The length of the tube and the quantity of material forming the tube are limiting factors in determining the size and wall thickness of the object that can be molded by this process. The fluidity of the melt obtained from bisphenol-A polycarbonate, or the lack of melt strength as well as the paucity of extrudate swelling, serve to limit blow molding applications to relatively small, thin walled parts. Temperatures must generally be carefully controlled to prevent the extruded tube from falling away before it attains the desired length and the mold is closed around it for blowing. Consequently, the Newtonian behavior of polycarbonate resin melts has severely restricted their use in the production of large hollow bodies by conventional extrusion blow molding operations as well as the production of various other shapes by profile extrusion methods.

Thermoplastic randomly branched polycarbonates exhibit unique properties on non-Newtonian flow, melt elasticity and melt strength which permit them to be used to obtain such articles as bottles which were not heretofore easily or readily produced with linear polycarbonates. The thermoplastic, randomly branched polycarbonates can be prepared by reacting a polychloroformate compound containing three or more chloroformate groups with a dihydric phenol and a carbonate precursor.

Branched polycarbonates derived from triphenolic and tetraphenolic compounds are known in the prior art.

DESCRIPTION OF THE INVENTION

This invention is directed to novel branched polycarbonates. The high molecular weight randomly branched polymers are the polycarbonates of an aromatic dihydric phenol(s) and a polyol in which the hydroxyl groups are attached to saturated aliphatic carbon atoms. The polyol compounds may be of the formula:

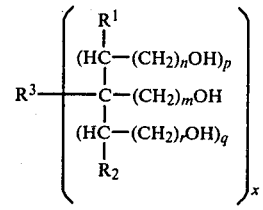

wherein $R^1$ and $R^2$ are hydrogen, hydroxy or hydroxy methylene; x is 1 or 2; where x is 2, $R^3$ is a divalent radical selected from —O—, —S— or —CH$_2$—O—CH$_2$—; when x is 1, $R^3$ is hydrogen, hydroxymethylene, aryl, alkyl, cycloalkyl, or hydroxy; n, m and r are integers 0, 1 or 2; and p and q are the integers 1 or 2.

The chloroformate compounds of formula II below that are used in the reaction to form the polycarbonate are derived from the polyol compounds of formula I.

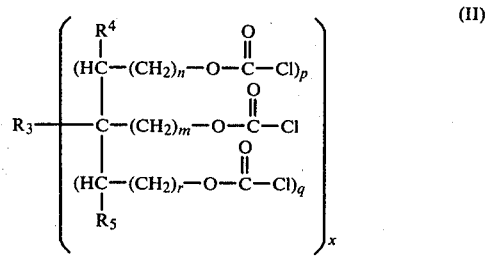

(II)

wherein $R^3$, n, m, r, p, q and x are the same as hereinabove defined. $R^4$ and $R^5$ are hydrogen, hydroxymethylene, hydroxy, —OC(O)Cl or —CH$_2$OC(O)Cl.

As used herein the term lower alkyl is used to include straight and branched chain lower alkyl groups of from 1 to 6 carbon atoms such as methyl, ethyl, n-propyl, isopropyl, sec.-butyl, tert.-butyl, n-hexyl and the like. The term aryl is used to include phenyl, naphthyl and lower alkyl substituted derivatives thereof. The term cycloalkyl is used to include $C_4$ to $C_8$ cycloalkyl groups such as cyclobutyl, cyclohexyl, cycloheptyl, dimethylcyclohexyl and the like.

Polyols for use in the practice of the invention include glycerine; 1,1,1-trimethylol ethane; 1,1,1-trimethylol propane; trimethylol methane; 1,1,1-trimethylol toluene; pentaerythritol; sorbitol; mannitol; diglycerol; dipentaerythritol; tris-hydroxyethylisocyanurate.

The method of making the high molecular weight randomly branched polycarbonates comprises:

(a) reacting a polyol of formula I with phosgene to transform at least three hydroxyl groups to chloroformate groups; and (b) reacting a minor amount of the product of step (a) with a dihydric phenol in the presence of a carbonic acid derivative to form a polycarbonate.

In the preparation of the novel thermoplastic randomly branched polycarbonates of this invention, the amount of the chloroformate compound which is reacted with the dihydric phenol and the carbonate precursor is critical to the extent that the amount employed must be sufficient to produce a true thermoplastic randomly branched polycarbonate which is substantially free of crosslinking. If an amount of chloroformate compound employed is less than about 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ about 0.01 to about 3.0 and more particularly, about 0.01 to about 1.0 mole percent of the chloroformate compound, based upon the total moles of dihydric phenol.

The dihydric phenols that can be employed in the practice of this invention include bis (4-hydroxyphenyl)methane, 1,1-bis(4-hydroxyphenyl)ethane, 2,2-bis(4-hydroxyphenyl)propane, also called bisphenol-A, or BPA, 2,2-bis(4-hydroxy-3-methylphenyl)propane, 3,3-bis(4-hydroxyphenyl)pentane, 2,2-bis(4-hydroxy-3-chlorophenyl)propane, 2,2-bis(4-hydroxy-3,5-dibromophenyl)propane, 1,1-bis(4-hydroxyphenyl)cyclohexane, p,p'-dihydroxydiphenyl), 3,3'-dichloro-4,4'-dihydroxyldiphenyl, bis(4-hydroxyphenyl)ether, bis(4-hydroxyphenyl)sulfone, bis(3,5-dimethyl-4-hydroxyphenyl)sulfone, resorcinol, hydroquinone; 1,4-hydroxy-2,5-dichlorobenzene, 1,4-dihydroxy-3-methylbenzene, bis(4-hydroxyphenyl)sulfoxide, bis(4-hydroxyphenyl)sulfide, bis(3,5-dimethyl-4-hydroxyphenyl)sulfoxide, and the like. A variety of additional dihydric phenols can also be employed such as are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with one or more dibasic acids in the event a polycarbonate copolymer or copolyestercarbonate rather than a homopolymer is desired for use in the preparation of the branched polymers of this invention. The preferred dihydric phenol is bisphenol-A.

The carbonate precursor employed can be either a carbonyl halide or a haloformate. Thus the carbonyl halides can be carbonyl chloride, carbonyl bromide, and mixtures thereof. The haloformates suitable for use include mono- or bishaloformates of dihydric phenols (bischloroformates of hydroquinone monochloroformate of bisphenol-A, etc.) or bishaloformates of glycols (bishaloformates of ethylene glycol, neopentyl glycol, polyethylene glycol, etc.). When using bishaloformates, equimolar amounts of free dihydric phenols are required to effect polymerization. When polymerizing monohaloformates of diphenols no free diphenol is required. While other carbonate precursors will occur to those skilled in the art, carbonyl chloride, also known as phosgene is preferred.

The polymerization of dihydric phenols to high molecular weight polycarbonates may be carried out by a conventional method known in the art. For example, phosgene can be introduced into a solution of the diphenol in organic bases, such as pyridine, triethylamine, dimethylaniline or into solutions of the diphenol in organic bases, such as pyridine, triethylamine, dimethylaniline or into solutions of the diphenol in suitable organic solvents, such as benzene, toluene, chlorobenzene, methylene chloride, carbon tetrachloride and the like, with addition of acid binding agents.

In the most widely practiced polymerization process phosgene is introduced into an aqueous solution of the alkali metal salt of the diphenol in the presence of methylene chloride and a phase-transfer catalyst as well as a molecular weight regulator, usually a mono-functional phenol. One advantage of the instant invention is that the chloroformate branching agent can be added in the desired amount, not only during the polymerization process but together with the diphenol at the beginning of the polymerization process. In other words, the chloroformate compounds can be formulated directly into the reaction mixture to be polymerized to branched polycarbonates.

The reaction between the halogen containing carbonate precursor and the dihydric phenol and the chloroformate branching agent when carried out by the interfacial method in accordance with this invention is conducted in the presence of an inert organic solvent which is essentially immiscible with water and does not deleteriously affect the formed polymer. Examples of suitable organic solvents are methylene chloride, ethylene dichloride and chlorobenzene.

In a preferred variant of the polymerization process, the branching chloroformate is added in the form of its solution in a non-reactive solvent. The novel branching agent may also be introduced into the reaction mixture of the dihydric phenol to be polymerized prior or during polymerization in a finely divided solid form or as a methylene chloride solution or slurry. If it is introduced during polymerization, the chloroformate of the polyol will react with the polycarbonate oligomers that are present. In either form it is copolymerized readily in the polycarbonate forming process and becomes a fully incorporated segment.

The alkali metal hydroxide which can be employed in the polymerization process can be any of the alkali metal hydroxides selected from the groups consisting of the alkali group and the alkaline earth groups. Specifically, these include potassium hydroxide, sodium hydroxide, lithium hydroxide, calcium hydroxide, magnesium hydroxide and the like.

The interfacial, or phase transfer catalysts, which can be employed in the polymerization process can be any of the suitable catalysts that aid the polymerization of dihydric phenols with phosgene. Suitable catalysts include teritiary amines such as triethylamine, tripropylamine, N,N-dimethylaniline and the like; quaternary ammonium compounds such as tetraethylammonium chloride, cetyl triethyl ammonium bromide, tetra-n-hepytlammonium iodide, tetra-n-propyl ammonium chloride tetramethylammonium chloride, tetramethylammonium hydroxide, tetra-n-butylammonium iodide, benzyltrimethylammonium chloride and the like; and quaternary phosphonium compounds such as n-butyltriphenyl phosphonium bromide and tetrabutyl phosphonium chloride and the like.

The molecular weight regulators which can be employed in the interfacial process include monohydric phenols such as phenol, chroman-I [4-(2,4,4-trimethylchromanyl)phenol], p-t-butylphenol, p-cumylphenol, and the like. Preferably, phenol is employed as the weight regulator.

An effective amount of a molecular weight regulator that will give modified melt flow value (KI) of 3,000 to 50,000 centiseconds, preferably from 5,000 to 30,000 centiseconds may be used. Generally, it is preferred to use from 2-5 mol% of phenol as the molecular weight regulator.

It is sometimes desirable to introduce reducing agents, such as sodium dithionite into the aqueous system in order to suppress the formation of colored contaminants.

The aqueous interfacial polymerization method may be carried out at temperatures from ambient to about 50° C. However, higher temperatures are within the scope of this invention since the instant method is not temperature dependent.

The chloroformates may be transformed into the corresponding aryl esters by reaction with a phenolic compound. This ester may then be used to form branched polycarbonates by transesterification with a diphenolic compound. The reaction may be carried out at temperatures from about 50° C. to about 325° C., at atmospheric or at reduced pressure, in neat form, or in the presence of neutral diluents or in the presence of transesterification catalysts, such as metal oxides, hydroxides and carbonates. Phenols are generated in the transesterification process, so that no molecular weight regulators need be added to the reaction mixture. In fact the degree of polymerization is controlled by the extent of removal of the monohydroxylic coproducts, such as alcohols or phenols.

The branched polycarbonates, when produced according to the instant invention by the interfacial polymerization technique, were recovered from the washed, neutral methylene chloride phase by steam precipitation and drying and were fed into an extruder operating at 265° C. and the extrudates were comminuted into pellets.

While some of the physical-mechanical measurements can be carried out directly with the polycarbonate powder or pellets, some tests require molded specimens. To provide these, the pellets are injection molded at about 315° C., into test bars according to the dimensions required by the test method, such as the notched Izod impact test carried out according to ASTM D-256.

The following test procedures were utilized:

Intrinsic viscosity (I.V.) was determined in methylene chloride solution at 25° C. and is given as deciliters per gram (dl/g).

Molecular weight determinations (number average, $M_n$; weight average, $M_w$ and Z-average, $M_z$), were carried out on Waters Associates GPC Model 200, in methylene chloride solution.

Modified melt flow (K.I.) values, expressed in centiseconds, were obtained by an automated ASTM D-1238 procedure at 300° C. on a Tinius Olsen Melt Indexer, Model T-3, Condition 0.

Melt index ratio (M.I.R.), which is the ratio of melt flow rates at two different shear levels, and is a measure of the non-Newtonian property of the polymer, was obtained in the Tinium Olsen Melt Indexer described above. The M.I.R. values of linear Newtonian polycarbonates are typically less than 1.4, while those of the branched polycarbonates are typically higher than 1.5.

The branched polycarbonates produced according to the instant invention are soluble in selected organic solvents and can be worked into shaped articles from solutions, such as into films. Being themoplastic, these branched polycarbonates, can be easily fabricated by conventional shaping methods from melt, such as by extrusion, molding, blow-molding, lamination and the like.

The branched polycarbonates of the invention may be combined with other polycarbonates or with thermoplastic polyesters such as polyethylene terephthalate or poly(1,4-butylene terephthalate). In addition, these branched polycarbonates may be combined with reinforcing fillers such as filamentous glass or with non-reinforcing fillers, mold release agents, flame retardants, impact modifiers, extrusion aids, light stabilizers, flame retardants, foaming agents, such as those disclosed in U.S. Pat. No. 4,263,409 and Ger. Offen. No. 2,400,086 which are incorporated by reference and the like if desired.

DESCRIPTION OF THE PREFERRED EMBODIMENTS

The following examples are set forth to illustrate and are not to be construed to limit the scope of the invention.

EXAMPLE 1

A three neck flask, that was fitted with a stirred, phosgene inlet tube and a dry ice condenser was placed in an ice bath and charged with 20.1 g of finely ground 1,1,1-trimethylol propane and 300 g. of liquid phosgene. As the reaction progressed, hydrogen chloride gas evolved and the solid slowly dissolved in the liquid phosgene. When the dissolution of the solid was complete, phosgene was allowed to evaporate and the colorless syrupy liquid was subjected to vacuum distillation. A colorless thick oil distilled over between 131 and 134° C. (0.5 mm Hg) and solidified in the receiver. The white crystals melted at 33°-34° C. and were shown to be the tris-chloroformate of 1,1,1-trimethylel propane by elemental analysis, proton nmr, ir and gc. $^{13}$Cnmr also confirmed the structure by the presence of 5 resonance peaks which occurred at 150.59 ppm for the carbonyl; at 70.42 ppm for the oxymethylene; at 41.58 ppm for the quaternary, and 22.73 and 7.23 ppm for the ethyl carbon atom.

EXAMPLE 2

A portion 1.3 g. (0.8 mol%) of the tris-chloroformate of Example 1 was dissolved in about 20 ml of methylene chloride and added to a slurry of 114.14 g. (0.5 mol%) of bisphenol-A, 300 ml of water, 460 ml of methylene chloride, 1.4 ml triethylamine, 1.5 g. (3.2 mol%) phenol in a four necked, two liter flask that was equipped with a stirrer, thermometer, phosgene inlet tube and a reflex condenser. Phosgene was sparged in at a rate of 1.2 g./minute for 45 minutes. The polymer was precipitated in methanol and was found to have an IV of 0.636 dl/g as measured in methylene chloride at 25° C.; a Tg of 149.8° C.; a KI of 38,480; and a MIR of 2.2.

EXAMPLE 3

Using the general procedure of example 1, 20.4 g. of pentaerythritol was transformed to the tetrakis-chloroformate using 100 ml of dioxane as an auxiliary solvent. The resultant thick syrup was distilled in vacuum to yield a colorless oil boiling at 150°–156° C. at 0.35 mm Hg that solidified. The white cyrstals melted at 65°–68° C. and were shown to be the tetrakis-chloroformate of pentaerythritol by elemental analysis, ir and gc. $^{13}$Cnmr shows only three kinds of carbon resonances: at 150.64 ppm for carbonyl; at 68.33 for methylene and at 42.83 ppm for the quaternary species.

EXAMPLE 4

A 0.3 g. (0.5 mol%) portion of the tetrachloroformate of pentaerythritol was dissolved in methylene chloride and added to a slurry of 34.2 g. (0.15 mol%) of bisphenol-A; 0.45 g. (3.2 mol%) of phenol; 0.4 ml (2 mol%) triethylamine; 400 ml of methylene chloride and 300 ml of water in a four necked, two liter flask that was equipped with a stirrer, thermometer, phosgene inlet tube, and reflux condenser. Phosgene was sparged in at a rate of 1.0 g/minute for 27 minutes. The polymer was precipitated with methanol and was found to have an IV of 0.582 dl/g as measured in methylene chloride at 25° C., a KI of 18,270 and a MIR of 2.0.

EXAMPLE 5

A polymerization was carried out using the same materials that were used in Example 4 except that the tetra-chloroformate of pentaerythritol was added after 5 minutes of phosgenation. The addition was made by adding the tetrakis-chloroformate as a 10% solution in methylene chloride over a ten minute period. The branched polycarbonate was recovered by precipitation in methanol and was found to have an IV of 0.569 dl/g as measured in methylene chloride at 25° C.; a KI of 16,350 and a MIR of 1.95.

EXAMPLE 6

A slurry of 57.1 g. (0.25 mol%) of bisphenol-A, 0.75 g. (3.2 mol%) of phenol and 0.7 ml (2 mol%) triethylamine was prepared with 400 ml of methylene chloride and 300 ml of water in a four necked, 2 liter flask. Methylene chloride used to dissolve 0.8 g. (0.8 mol%) of the tris-chloroformate of pentaerythritol and this solution was added to the slurry prior to the sparging in of 27.0 g. (110 mol%) of phosgene at a rate of 1.0 g/minute. Methanol was used to precipitate the branched polycarbonate polymer which had an IV of 0.543 dl/g. as measured in methylene chloride at 25° C.; a KI 19,800 and an MIR of 2.17.

Obviously many variations will suggest themselves to those skilled in the art from the above detailed description without departing from the scope or spirit of the invention. It is, therefore, to be understood that changes may be made in the particular embodiments of the invention as defined by the appended claims.

What is claimed is:

1. A high molecular weight randomly branched polycarbonate of an aromatic dihydric phenol; a polyol in which the hydroxyl groups are attached to saturated aliphatic carbon atoms in an amount sufficient to produce a thermoplastic randomly branched polycarbonate which is substantially free of crosslinking; and a carbonate precursor selected from the group consisting of a carbonyl halide and a haloformate.

2. The high molecular weight randomly branched polycarbonate of claim 1 in which the aromatic dihydric phenol is bisphenol-A.

3. The high molecular weight randomly branched polycarbonate of claim 1 wherein the polyol is of the formula:

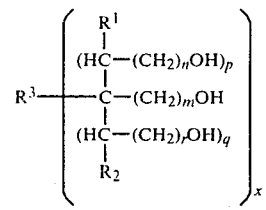

wherein $R^1$ and $R^2$ are hydrogen, hydroxy or hydroxy methylene; x is 1 or 2; when x is 2, $R^3$ is a divalent radical selected from —O—, —S— or —CH$_2$—O—CH$_2$; when x is 1, $R^3$ is hydrogen, hydroxymethylene, aryl, lower alkyl, cycloalkyl or hydroxy; m and r the integers 0, 1 or 2; and p and q are the integers 1 or 2.

4. The high molecular weight randomly branched polycarbonate of claim 2 wherein the polyol is 1,1,1-trimethylol propane.

5. The high molecular weight randomly branched polycarbonate of claim 2 wherein the polyol is 1,1,1-trimethylol ethane.

6. The high molecular weight randomly branched polycarbonate of claim 2 wherein the polyol is pentaerythritol.

7. The high molecular weight randomly branched polycarbonate of claim 2 wherein the polyol is dipentaerythritol.

8. The high molecular weight randomly branched polycarbonate of claim 1 wherein the polyol is present in an amount of from about 0.01 to about 3.0 mole percent based upon the total moles of the dihydric phenol.

* * * * *

UNITED STATES PATENT AND TRADEMARK OFFICE
CERTIFICATE OF CORRECTION

PATENT NO. : 4,415,722
DATED : November 15, 1983
INVENTOR(S) : Victor Mark and Charles V. Hedges It is certified that error appears in the above-identified patent and that said Letters Patent are hereby corrected as shown below:

Column 6, line 48

"1,1,1-trimethyle1"

should be

"1,1,1-trimethylol"

Signed and Sealed this

Second Day of July 1985

[SEAL]

Attest:

DONALD J. QUIGG

Attesting Officer    Acting Commissioner of Patents and Trademarks